US010337965B2

(12) United States Patent
Hiraoka et al.

(10) Patent No.: US 10,337,965 B2
(45) Date of Patent: Jul. 2, 2019

(54) FT DIAGRAM CREATION ASSISTANCE DEVICE AND FT DIAGRAM CREATION ASSISTANCE METHOD

(75) Inventors: Youji Hiraoka, Isehara (JP); Tamotsu Murakami, Tokyo (JP)

(73) Assignees: JATCO LTD, Fuji-Shi (JP); THE UNIVERSITY OF TOKYO, Tokyo (JP)

( * ) Notice: Subject to any disclaimer, the term of this patent is extended or adjusted under 35 U.S.C. 154(b) by 1195 days.

(21) Appl. No.: 14/352,186

(22) PCT Filed: Sep. 7, 2012

(86) PCT No.: PCT/JP2012/072917
§ 371 (c)(1),
(2), (4) Date: Apr. 16, 2014

(87) PCT Pub. No.: WO2013/058028
PCT Pub. Date: Apr. 25, 2013

(65) Prior Publication Data
US 2015/0168269 A1 Jun. 18, 2015

(30) Foreign Application Priority Data
Oct. 19, 2011 (JP) .................................. 2011-229597

(51) Int. Cl.
*G01M 99/00* (2011.01)
*G05B 23/00* (2006.01)
(Continued)

(52) U.S. Cl.
CPC ........... *G01M 99/005* (2013.01); *G05B 23/00* (2013.01); *G05B 23/0248* (2013.01);
(Continued)

(58) Field of Classification Search
CPC . G01M 99/005; G05B 23/0248; G05B 23/00; G05B 23/0275; G06F 11/0706; G06F 11/079
USPC .......................................................... 703/21
See application file for complete search history.

(56) References Cited

U.S. PATENT DOCUMENTS

2009/0113247 A1    4/2009 Gofuku et al.

FOREIGN PATENT DOCUMENTS

JP    05-143570 A    6/1993
JP    11-184875 A    7/1999
(Continued)

OTHER PUBLICATIONS

Bucci et. al., Construction of event-tree/fault-tree models from a Markov approach to dynamic system reliability, Elsevier Ltd., Reliability Engineering and System Safety 93 (2008) 1616-1627.*
(Continued)

*Primary Examiner* — Rehana Perveen
*Assistant Examiner* — Justin C Mikowski
(74) *Attorney, Agent, or Firm* — Foley & Lardner LLP

(57) ABSTRACT

An event is classified as a fault of hardware or a fault of a system or a control system. When the event is classified as the fault of the hardware, the event is expanded into lower events, physical quantities of the event and the lower events are acquired, and it is examined whether the event is expanded properly or not based on relationship between the physical quantity of the event and the physical quantities of the lower events. When the event is classified as the fault of the system or the control system, a block diagram of the system or the control system is created, and the event is expanded into the lower events based on input/output relationship in the block diagram of the system or the control system.

9 Claims, 15 Drawing Sheets

(51) Int. Cl.
G05B 23/02 (2006.01)
G06F 11/07 (2006.01)
(52) U.S. Cl.
CPC ...... *G05B 23/0275* (2013.01); *G06F 11/0706* (2013.01); *G06F 11/079* (2013.01)

(56) References Cited

FOREIGN PATENT DOCUMENTS

JP   2009-123110 A   6/2009
JP   2009-289020 A   12/2009

OTHER PUBLICATIONS

Pullum et. al., Fault Tree Models for the Analysis of Complex Computer-Based Systems, 1996 Proceedings Annual Reliability and Maintainability Symposium, IEEE, pp. 200-207.*
Yiannis Papadopoulos et al., Evolving car designs using model-based automated safety analysis and optimisation techniques, The Journal of Systems and Software 76 (2005) 77-89 (Year: 2005).*
Anonymous: "Fault Tree Analysis Support Software Developed, Allows for High Design Reliability". *JATCO Ltd., University of Tokyo, National Institute of Advanced Industrial Science and Technology (AIST)*, http://www.t.u-tokyo.ac.jp/pdf/2011/110905_FTA_E.pdf, Sep. 5, 2011, pp. 1-7.
Murakami, Tamotsu et al., "Knowledge Management for Fault Tree Analysis Based on Quantity Dimension Indexing", *Proceedings of the ASME International Design Engineering Technical Conferences and Computers and Information in Engineering Conference*, Aug. 6, 2008, pp. 841-850.

* cited by examiner

FT DIAGRAM CREATION ASSISTANCE DEVICE AND FT DIAGRAM CREATION ASSISTANCE METHOD

TECHNICAL FIELD

The present invention relates to technology for analyzing a cause of a failure of a device, a system and the like, and improving reliability thereof.

BACKGROUND ART

A fault tree analysis (FTA) is a technique for expanding a fault event into causative lower events by taking a logical sum (OR) or a logical product (AND) thereof, so as to create a tree structure (hereinafter referred to as an "FT diagram"), and for extracting a major cause from the lower events to reexamine its design in order to prevent the occurrence of a fault. In creating the FT diagram, comprehensive knowledge and a high degree of specialization in its field are required, and therefore, technology for assisting the creation of the FT diagram is required (JP2009-289020A).

FIG. 15 is an example of the FT diagram. In this example, the fault event of "high power transmission loss by pulley" is analyzed. As this fault event is caused at the time of "large slip amount" or "large frictional force", the "large slip amount" and the "large frictional force" are the lower events of the fault event, which have the logical sum relationship.

As the event of the "large frictional force" is caused at the time of "large reaction force" or "large coefficient of friction", the "large reaction force" and the "Large coefficient of friction" are the lower events of the "large frictional force", which have the logical sum relationship. As the event of the "large reaction force" is caused at the time of "large belt tension" the "large belt tension" is the lower event of the "large reaction force".

The events of the "large slip amount", the "large belt tension", and the "large coefficient of friction" that cannot be expanded into further lower events, among the above-described events, are referred to as fundamental events, and it is necessary to examine measures against these fundamental events in order to prevent the occurrence of the fault event.

It should be noted that, in this example, higher events and the lower events are connected simply by lines, and no description is made whether the lower events on the same level have the logical sum relationship or the logical product relationship. The reason for this is that, as most of the lower events on the same level have the logical sum relationship, the higher events and the lower events, and the lower events on the same level are connected simply by the lines when the events have the logical sum relationship, and the description of "AND", meaning the logical product, is made next to the line connecting the higher event and the lower event when the events have the logical product relationship.

SUMMARY OF INVENTION

It is an object of the present invention to create an FT diagram with a less workload and with higher accuracy.

According to an aspect, creation of the FT diagram is assisted by: classifying an event as a fault of hardware or a fault of a system (including a subsystem) or a control system; expanding the event into lower events, acquiring physical quantities of the event and the lower events, and examining whether the event is expanded properly or not based on relationship between the physical quantity of the event and the physical quantities of the lower events, when the event is classified as the fault of the hardware; and creating a block diagram of the system or the control system, and expanding the event into the lower events based on input/output relationship in the block diagram of the system or the control system, when the event is classified as the fault of the system or the control system.

According to another aspect, creation of the FT diagram is assisted by: creating a block diagram of a system relating to a fault event, and expanding the fault event into lower events based on input/output relationship in the block diagram; allowing the event capable of expanding into a further lower event, among the lower events, to be an expandable event, and classifying the expandable event as a fault of hardware or a fault of a subsystem or a control system; expanding the expandable event into the further lower event, acquiring physical quantities of the expandable event and the further lower event, and examining whether the expandable event is expanded properly or not based on relationship between the physical quantity of the expandable event and the physical quantity of the further lower event, when the expandable event is classified as the fault of the hardware; and creating a block diagram of the subsystem or the control system, and expanding the expandable event into the further lower event based on input/output relationship in the block diagram of the subsystem or the control system, when the expandable event is classified as the fault of the subsystem or the control system.

According to these aspects, it is possible to create the FT diagram with the less workload and with the higher accuracy.

An embodiment of the present invention and advantages of the present invention will be explained in detail below, with reference to the attached drawings.

DESCRIPTION OF EMBODIMENTS

<General Arrangement>

Figure 1:
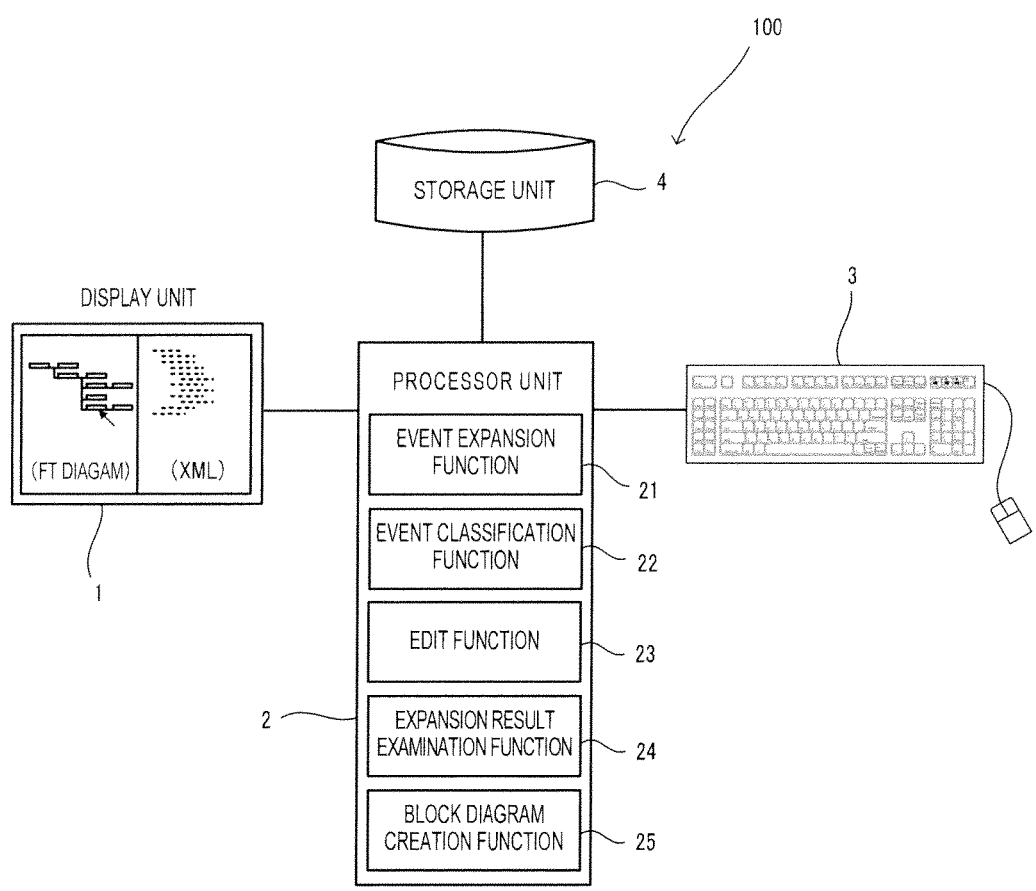
FIG. 1 is a view illustrating the general arrangement of an FT diagram creation assistance device.

FIG. 1 illustrates the general arrangement of an FT diagram creation assistance device 100 according to an embodiment of the present invention. The FT diagram creation assistance device 100 is provided with a display unit 1, a processor unit 2, and an operation unit 3.

The processor unit 2 is formed by a microprocessor, RAM, ROM and the like. The microprocessor reads a program stored in the ROM or in a storage unit 4 that will be described later into the RAM and executes the program, so as to implement an event expansion function 21, an event classification function 22, an edit function 23, an expansion result examination function 24, and a block diagram creation function 25.

An FT diagram is represented by XML data describing the relationship between events (tree structure), contents and physical quantities of the respective events, and the like, in the processor unit 2, and the XML data corresponding to the FT diagram, together with the FT diagram, is displayed on the display unit 1.

The event expansion function 21 is the function of automatically expanding a specific event (a fault of a system, a subsystem, or a control system) to lower events, based on input/output relationship in a block diagram of the part relating to the specific event. The details of processing for implementing this function will be described later.

The event classification function 22 is the function of classifying the specific event into a fault of hardware or the fault of the system (including the subsystem) or a control system. An operator inputs via the operation unit 3 whether the event falls under the fault of the hardware or the fault of the system or the control system, and then the classification is made based on the input result.

The edit function 23 is the function of editing the FT diagram on the display unit 1 based on the input from the operation unit 3. Specific functions include addition of the event, movement of the event, copy and paste of the event, deletion of the event, addition and correction of the contents of the event, addition and correction of the physical quantities of the respective events, and the like. The contents edited on the display unit 1 are immediately reflected on the XML data representing the FT diagram.

The block diagram creation function 25 is the function of creating the block diagram on the display unit 1, based on the input from the operation unit 3. Specific functions include addition of the block, movement of the block, copy and paste of the block, deletion of the block, addition and correction of the contents of the block, addition and correction of the input/output relationship of the block, and the like.

The operation unit 3 is an input device such as a keyboard, a mouse, or the like. The operation unit 3 receives various types of operation from the operator.

<Creating Procedure of FT Diagram>

Figure 2:
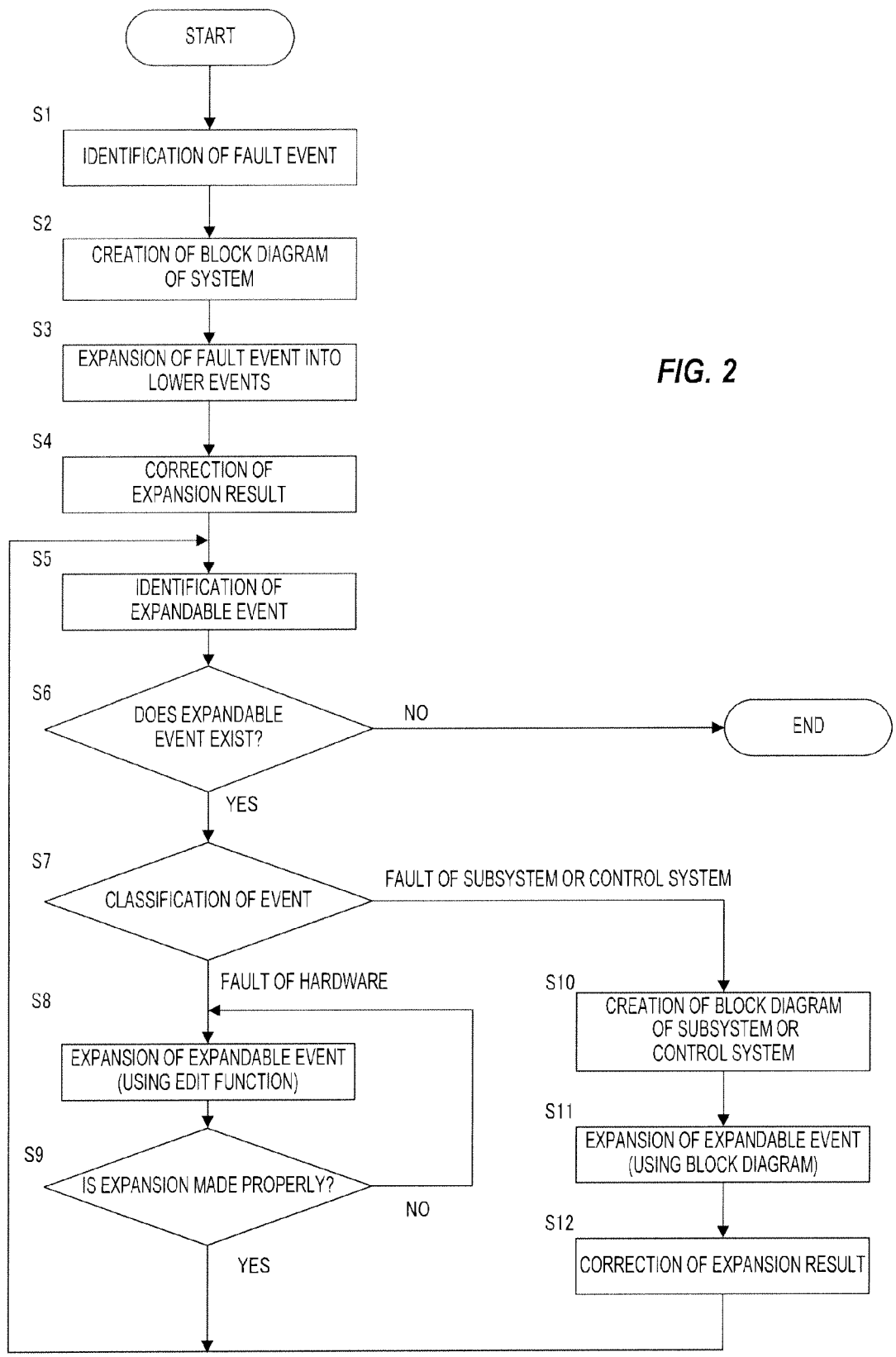
FIG. 2 is a flowchart illustrating a creating procedure of an FT diagram.

FIG. 2 is a flowchart illustrating a creating procedure of the FT diagram. The creating procedure of the FT diagram will be explained specifically with reference to this flowchart. An explanation will be given to the case of analyzing the fault event of "large shift shock" of an automatic transmission (hereinafter referred to as an "AT") as a specific example according to this embodiment, in order to facilitate understanding of the contents of the procedure.

In S1, the fault event is identified. The operator operates the operation unit 3 and creates a new fault event on the display unit 1 by using the edit function 23 of the processor unit 2, so as to identify the fault event. In the specific example, the event of the "large shift shock" that is created by the operator on the display unit 1 is identified as the fault event.

In S2, a block diagram of a system corresponding to the fault event is created. The block diagram is created on the display unit 1 by the operator operating the operation unit 3 by using the block diagram creation function 25 of the processor unit 2.

Figure 4:
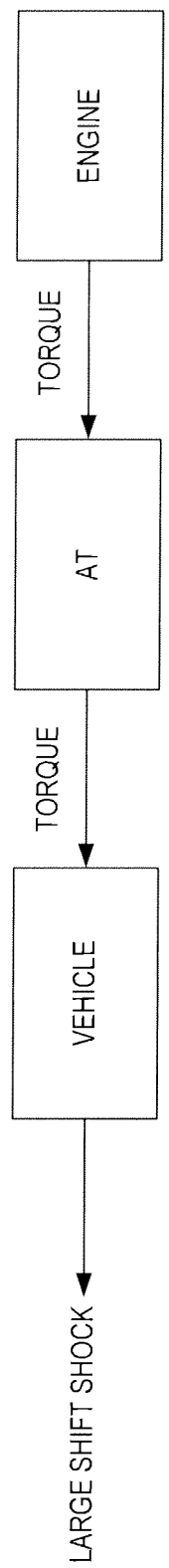
FIG. 4 is a block diagram of a system relating to "large shift shock"

FIG. 4 is a block diagram created in the specific example. According to the created block diagram, parts relating to the shift shock are "a vehicle", an "AT", and an "engine", and output torque of the engine is inputted to the AT, output torque of the AT is inputted to the vehicle, and as a result of this, the shift shock is outputted from the vehicle.

Returning back to FIG. 2 and in S3, the fault event is expanded into the lower events. The expansion into the lower events is carried out automatically by using the event expansion function 21 of the processor unit 2, based on the input/output relationship in the block diagram created in S2, according to the procedure illustrated in FIG. 3.

Figure 3:
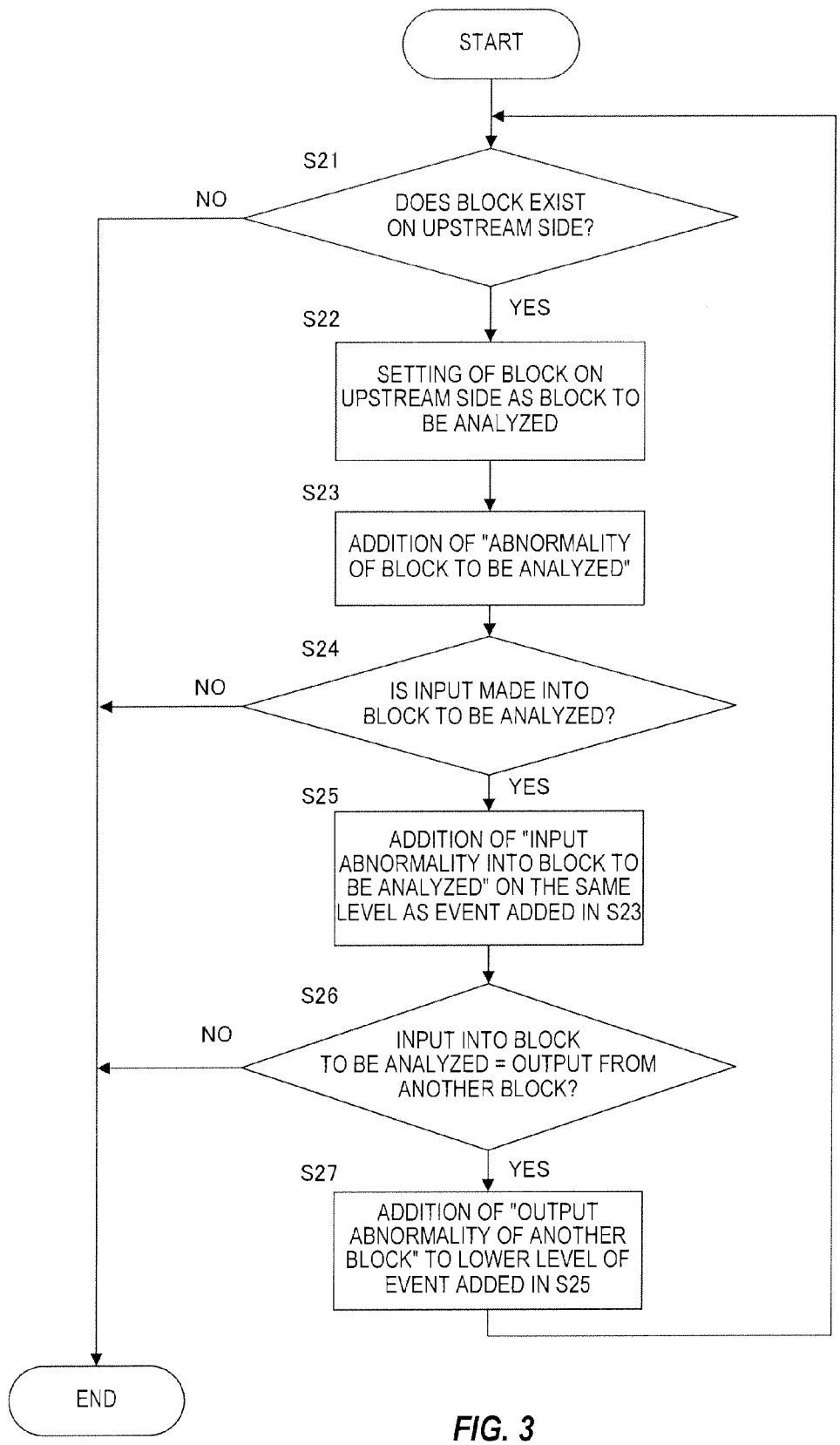
FIG. 3 is a flowchart illustrating a procedure of expanding a specific event into lower events based on input/output relationship in a block diagram.

The procedure of expanding the fault event into the lower events will be explained with reference to FIG. 3.

First, in S21, the processor unit 2 starts from the downstream end of the block diagram and determines whether the block exists or not on the upstream side. The processing proceeds to S22 if there is the block on the upstream side, and if there is not, the processing finishes.

In S22, the processor unit 2 sets the block on the upstream side as a block to be analyzed. In the specific example illustrated in FIG. 4, the block of the "vehicle" exists on the upstream side, and hence this block is set as the block to be analyzed.

In S23, the processor unit 2 adds "abnormality of block to be analyzed" as the lower event. In the specific example, "vehicle abnormality" is added as the lower event of the "large shift shock" (51 in FIG. 5).

In S24, the processor unit 2 determines whether an input is made into the block to be analyzed or not. The processing proceeds to S25 if the input is made into the block to be analyzed, and if it is not, the processing finishes.

In S25, the processor unit 2 adds "input abnormality into block to be analyzed" on the same level as the event added in S23.

Figure 5:
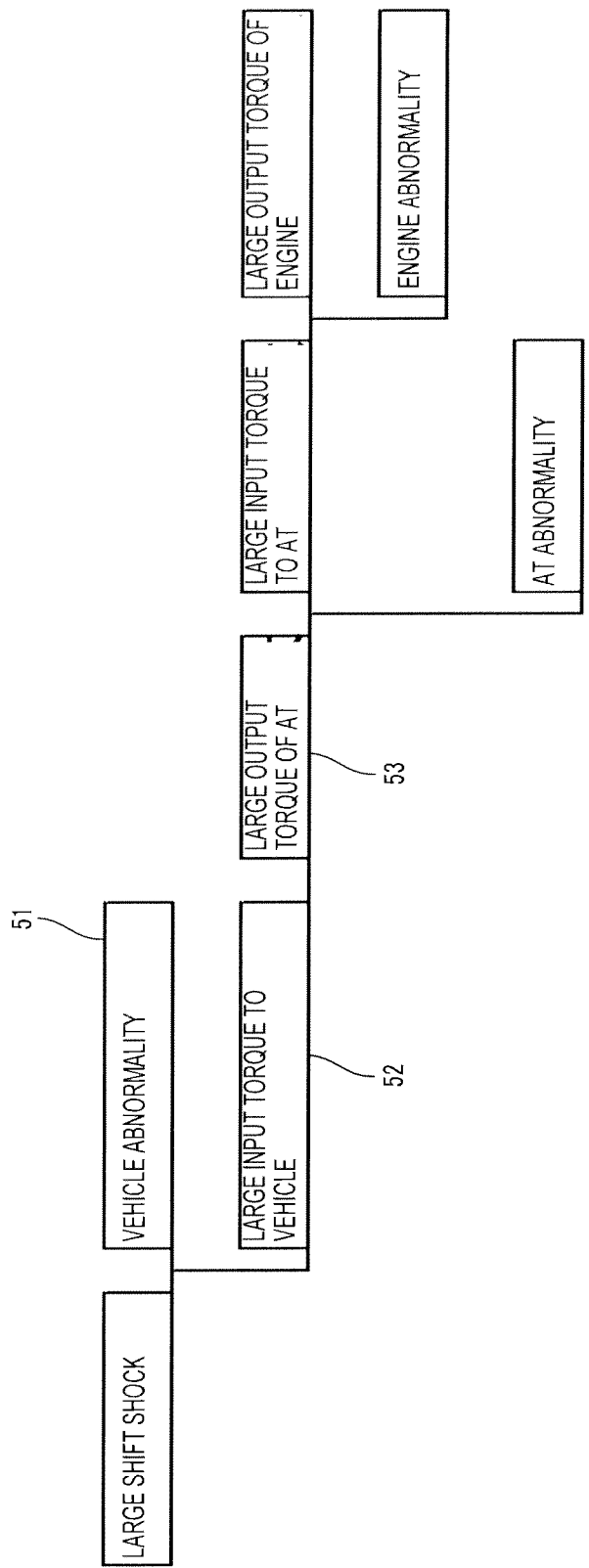
FIG. 5 is a view explaining the creating procedure of the FT diagram.

In the specific example illustrated in FIG. 4, the torque is inputted from the "AT" into the "vehicle", and hence "large input torque to vehicle" is added as the lower event of the "large shift shock" on the same level as the "vehicle abnormality" added in S23 (52 in FIG. 5).

In S26, the processor unit 2 determines whether the input into the block to be analyzed is the same as the output from another block or not. The processing proceeds to S27 if the input into the block to be analyzed is the same as the output from another block, and if it is not, the processing finishes.

In the specific example as illustrated in FIG. 4, the input into the "vehicle", as the block to be analyzed, is the same as the output from the "AT", and therefore, the processing proceeds to S27.

In S27, the processor unit 2 adds "output abnormality of another block" to the lower level of the event added in S25.

In the specific example illustrated in FIG. 4, "large output torque of AT" is added to the lower level of the "large input torque to vehicle" added in S25 (53 in FIG. 5).

Thereafter, the processing returns to S21, and the determination is made whether the block exists on the further upstream side of the block to be analyzed or not (S21), and the processing in and after S22 is repeated when the block exists on the further upstream side.

According to the processing as described thus far, the fault event is expanded into the lower events and, in the specific example illustrated in FIG. 4, the "large shift shock" as the fault event is automatically expanded based on the input/output relationship of the respective blocks, into the state as illustrated in FIG. 5.

Returning back to FIG. 2, the explanation about the creating procedure of the FT diagram will be continued.

In S4, the contents of the expansion result of S3 are corrected. In this case, the operator operates the operation unit 3, selects the lower event that needs to be corrected, and corrects the contents as appropriate by using the edit function 23, when the expansion result of S3 is not perfect.

Figure 6:
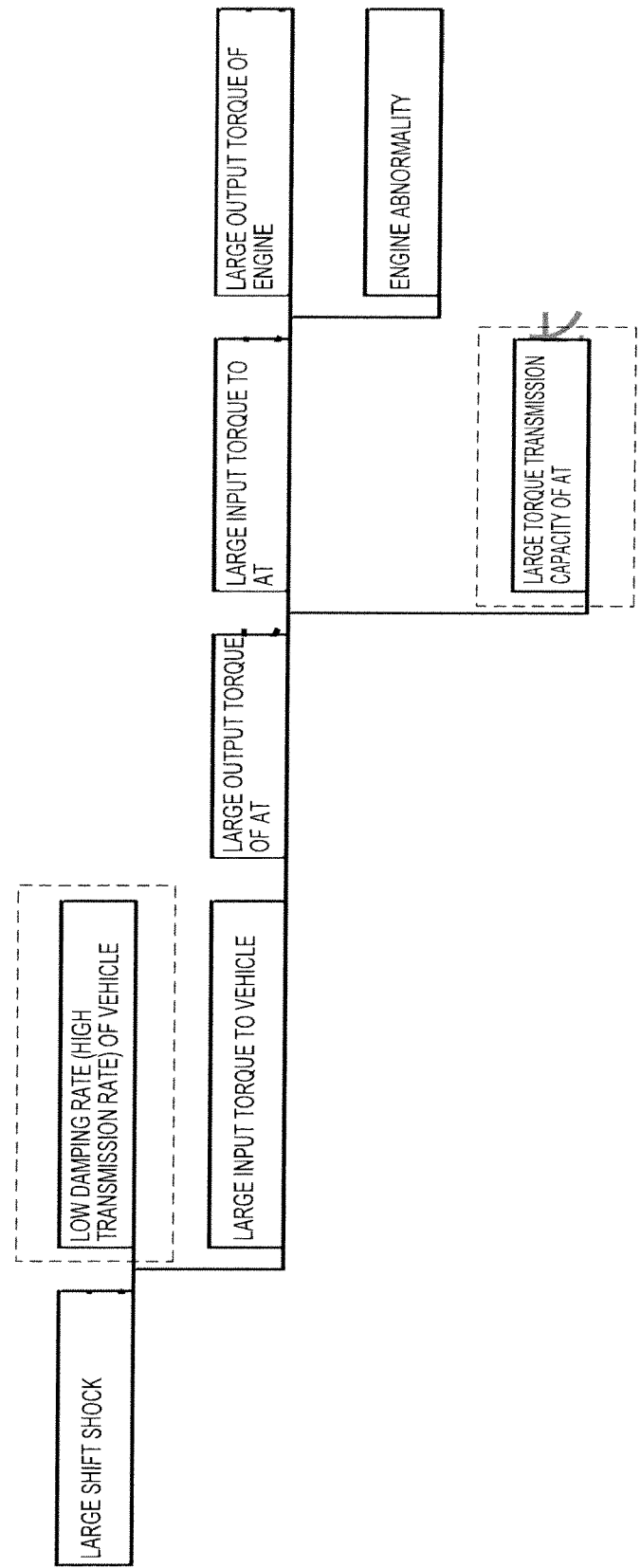
FIG. 6 is a view explaining the creating procedure of the FT diagram.

FIG. 6 illustrates the expansion result after the correction. Corrected parts are in broken line boxes, and the "vehicle abnormality" and "AT abnormality" in FIG. 5 are corrected as "low damping rate (high transmission rate) of vehicle" and "large torque transmission capacity of AT", respectively.

In S5, the event that can be expanded into the further lower event (the lower event that is not the fundamental event, which will be referred to as an "expandable event" below) is identified. The operator operates the operation unit 3, and selects the event that is determined to be expandable based on knowledge of the past and expansion examples of similar events, from among the lower events, so as to make the identification.

The identification of the expandable event is made by the operator operating the operation unit 3 in this case, but the expandable event may be identified automatically based on the result of comparison with a list of expandable events stored in the storage unit 4.

In the specific example illustrated in FIG. 6, the "large torque transmission capacity of AT" is identified as the expandable event.

Next, it is determined whether the expandable event exists or not in S6. This determination is made based on whether the specific event is identified as the expandable event in S5 or not. When there is no expandable event, the FT diagram has been completed by the expansion in S3, the correction of the expansion result in S4, or the processing in and after S7 that will be explained later, and therefore, the processing finishes. If this is not the case, the processing proceeds to S7.

In S7, the processor unit 2 determines whether the expandable event is the fault of the hardware, or the fault of the subsystem or the control system. For example, a selection screen is displayed on the display unit 1, and the operator selects either the fault of the hardware, or the fault of the subsystem or the control system via the operation unit 3, so as to make this determination based on the selection result.

This kind of determination is made because an expansion procedure of the expandable event is different between the case where the expandable event is the fault of the hardware and the case where the expandable event is the fault of the subsystem or the control system. When it is determined that the expandable event is the fault of the hardware, the processing proceeds to S8, and when it is determined that the expandable event is the fault of the subsystem or the control system, the processing proceeds to S10.

Although the classification of the expandable event is made based on the input from the operation unit 3 in this case, the expandable event may be classified automatically by the processor unit 2 referring to a table stored in the storage unit 4, the table indicating that the various events are either the faults of the hardware or the faults of the subsystem or the control system.

In the specific example illustrated in FIG. 6, the "large torque transmission capacity of AT" is the fault of the hardware, and therefore, the processing proceeds to S8.

In S8 and S9, the expandable event is expanded into the further lower events, according to the expansion method suitable for the fault of the hardware.

First, in S8, the operator operates the operation unit 3 to expand the expandable event on the display unit 1. The operator operates the operation unit 3 and adds the lower events (the contents of the events and the physical quantities thereof) of the expandable event by using the edit function 23 of the processor unit 2, so as to make the expansion.

Figure 7:
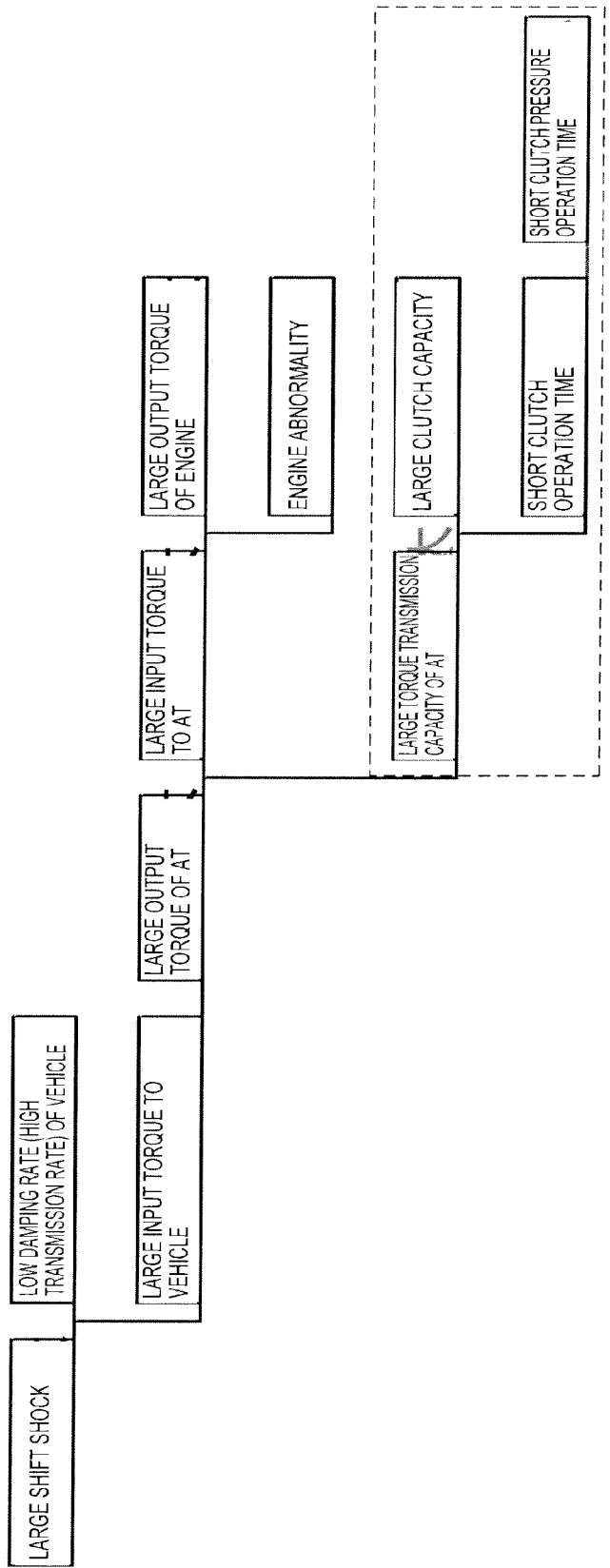
FIG. 7 is a view explaining the creating procedure of the FT diagram.

FIG. 7 illustrates the state in which the "large torque transmission capacity of AT" in FIG. 6 is expanded into the further lower events. An expanded part is in a broken line box.

In S9, the processor unit 2 determines whether the expansion of the expandable event in S8 is made properly or not. This determination is made by using the expansion result examination function 24 of the processor unit 2, based on the relationship between the physical quantity of the expandable event and the physical quantities of its lower events. Specifically, the processor unit 2 determines whether either one of the following is satisfied or not, and determines that the expansion of the expandable event is made properly when either one of these is satisfied (physical quantity dimensional indexing method).

A unit of the physical quantity of the expandable event can be represented by addition and subtraction of units of the physical quantities of its lower events. In other words, the physical quantity of the expandable event is commensurate with the physical quantities of its lower events.

The unit of the physical quantity of the expandable event can be represented by multiplication and division or exponentiation of the units of the physical quantities of its lower events. In other words, the unit of the physical quantity of the expandable event can be represented by using the units of the physical quantities of its lower events.

Figure 8:
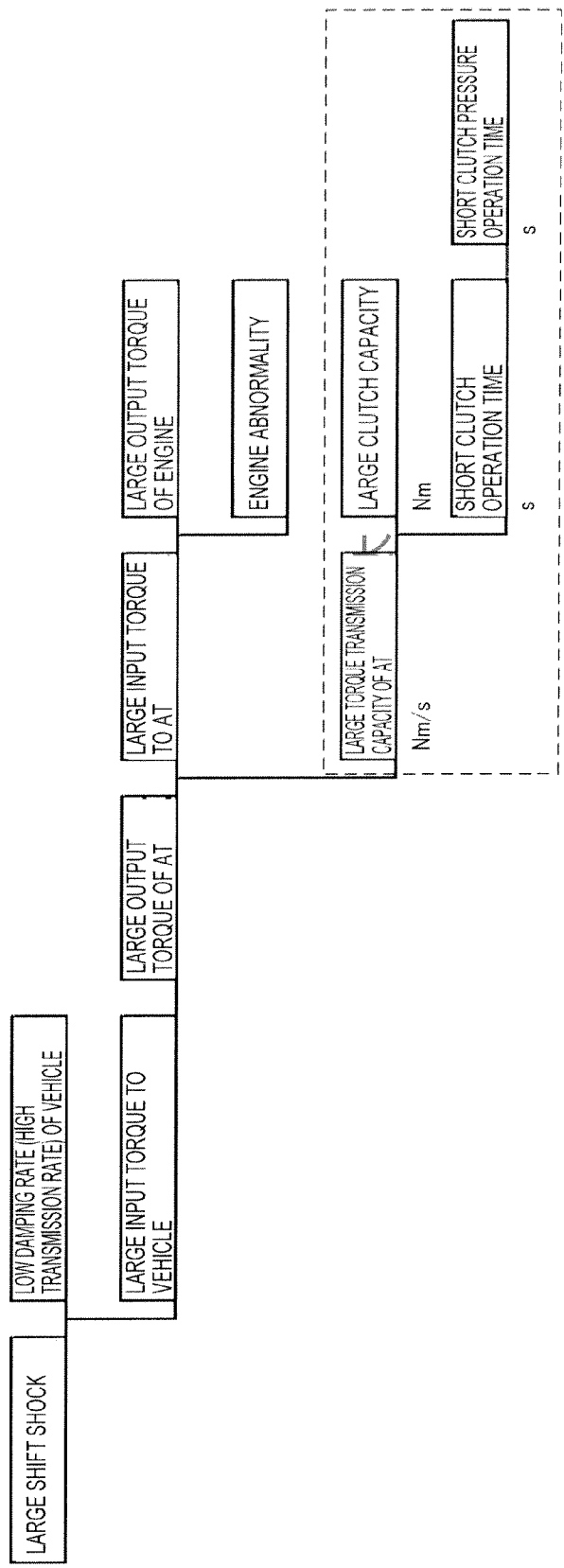
FIG. 8 is a view explaining the creating procedure of the FT diagram.

FIG. 8 illustrates the physical quantities of the respective events in the part expanded in S8. The physical quantity of the "large torque transmission capacity of AT", as the expandable event, is Nm/s, and the physical quantities of "large clutch capacity", "short clutch operation time", and "short clutch pressure operation time", as its lower events, are Nm, s, and s, respectively. In this example, the physical quantity of the expandable event can be represented by the division of the physical quantities of its lower events (Nm/s=Nm÷s), and therefore, it is determined that the expansion is made properly in this case.

When the expansion of the expandable event is made properly, the processing returns back to S5 to identify another expandable event and carry out the processing in and after S6 again. If this is not the case, the processing returns back to S8 to correct the event expanded from the expandable event.

In the specific example of FIG. 8, the "short clutch pressure operation time" that is added as a result of the expansion is identified as the expandable event, and the processing in and after S6 is carried out again.

In S10 to S12, the processor unit 2 expands the expandable event into the further lower events, according to the expansion method suitable for the fault of the subsystem or the control system.

In S10, a block diagram of the subsystem or the control system is created. The operator operates the operation unit 3 by using the block diagram creation function 25 of the processor unit 2, so as to create the block diagram on the display unit 1.

In the specific example, the "short clutch pressure operation time" in FIG. 8 is the expandable event and is the fault of the subsystem, and therefore, the processing proceeds to S10, and a block diagram of the subsystem is created.

Figure 9:
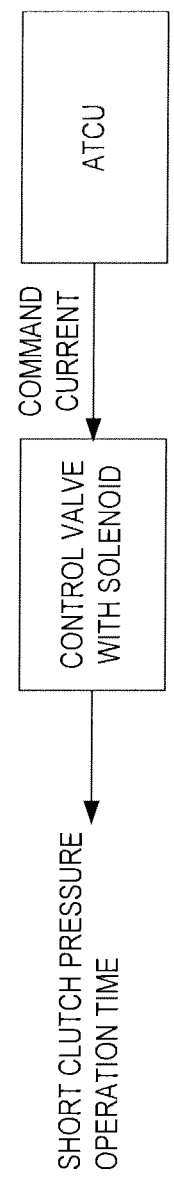
FIG. 9 is a view explaining the creating procedure of the FT diagram.

FIG. 9 is the created block diagram. The subsystem is formed by a "control valve with solenoid" and an "ATCU", and a command current is inputted from the "ATCU" into the "control valve with solenoid".

In S11, the processor unit 2 expands the expandable event into the further lower event. The expanding procedure of the expandable event is the same as the procedure illustrated in FIG. 3, which is performed automatically by using the event expansion function 21 of the processor unit 2, based on the input/output relationship in the block diagram created in S10.

Figure 10:
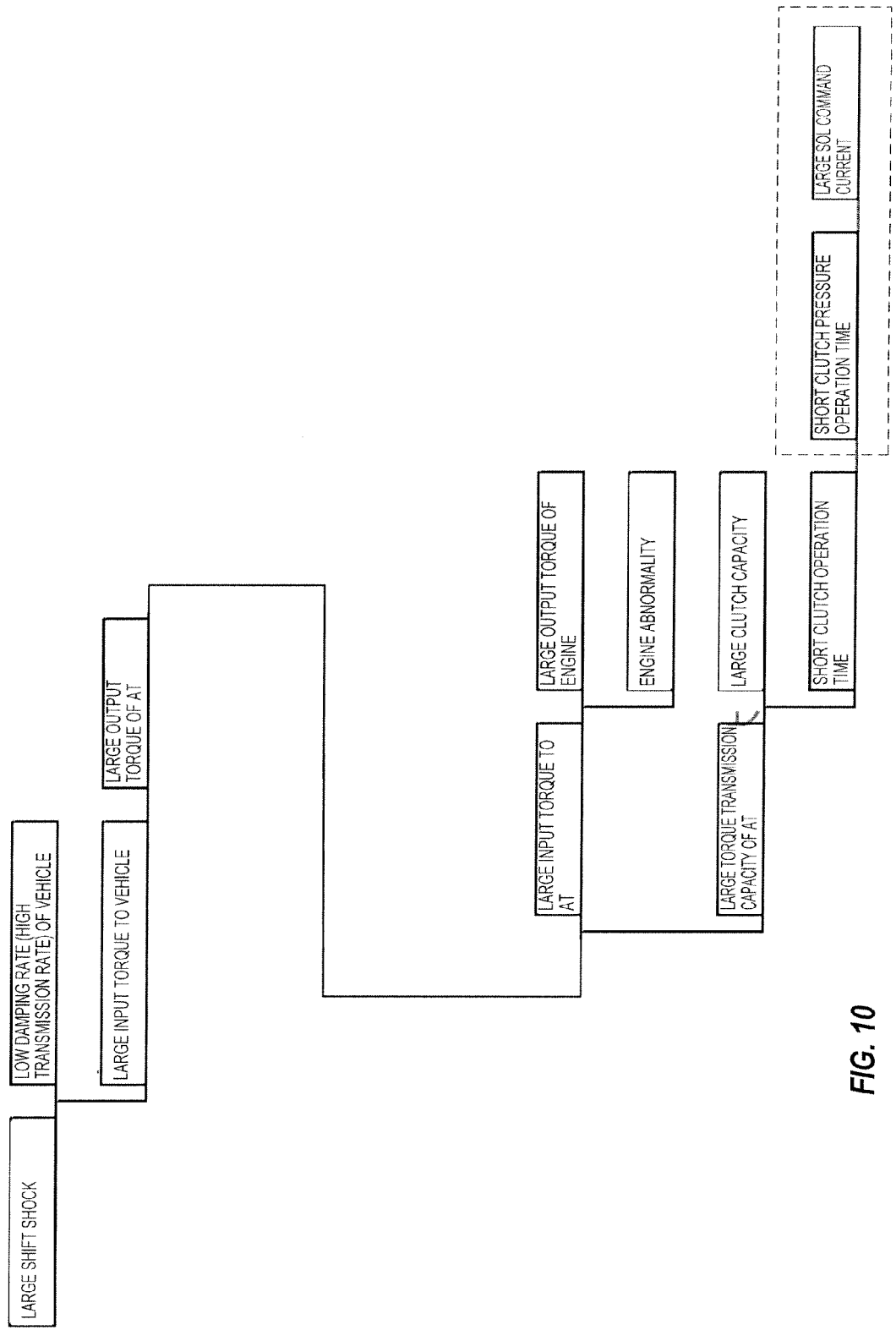
FIG. 10 is a view explaining the creating procedure of the FT diagram.

FIG. 10 illustrates the state in which the "short clutch pressure operation time" as the expandable event is expanded, and "large SOL command current" is added to its lower level.

In S12, the expansion result of S11 is corrected. Specifically, the operator operates the operation unit 3, selects the lower event whose contents need to be corrected, from among the lower events, and rewrites the contents by using the edit function 23 of the processor unit 2, so as to make the correction.

In the specific example illustrated in FIG. 10, the expansion of the "short clutch pressure operation time" is made properly, and therefore, no correction is made in S12 in particular.

Thereafter, the processing returns back to S5 to identify another expandable event and carry out the processing in and after S6 again.

Figure 11:
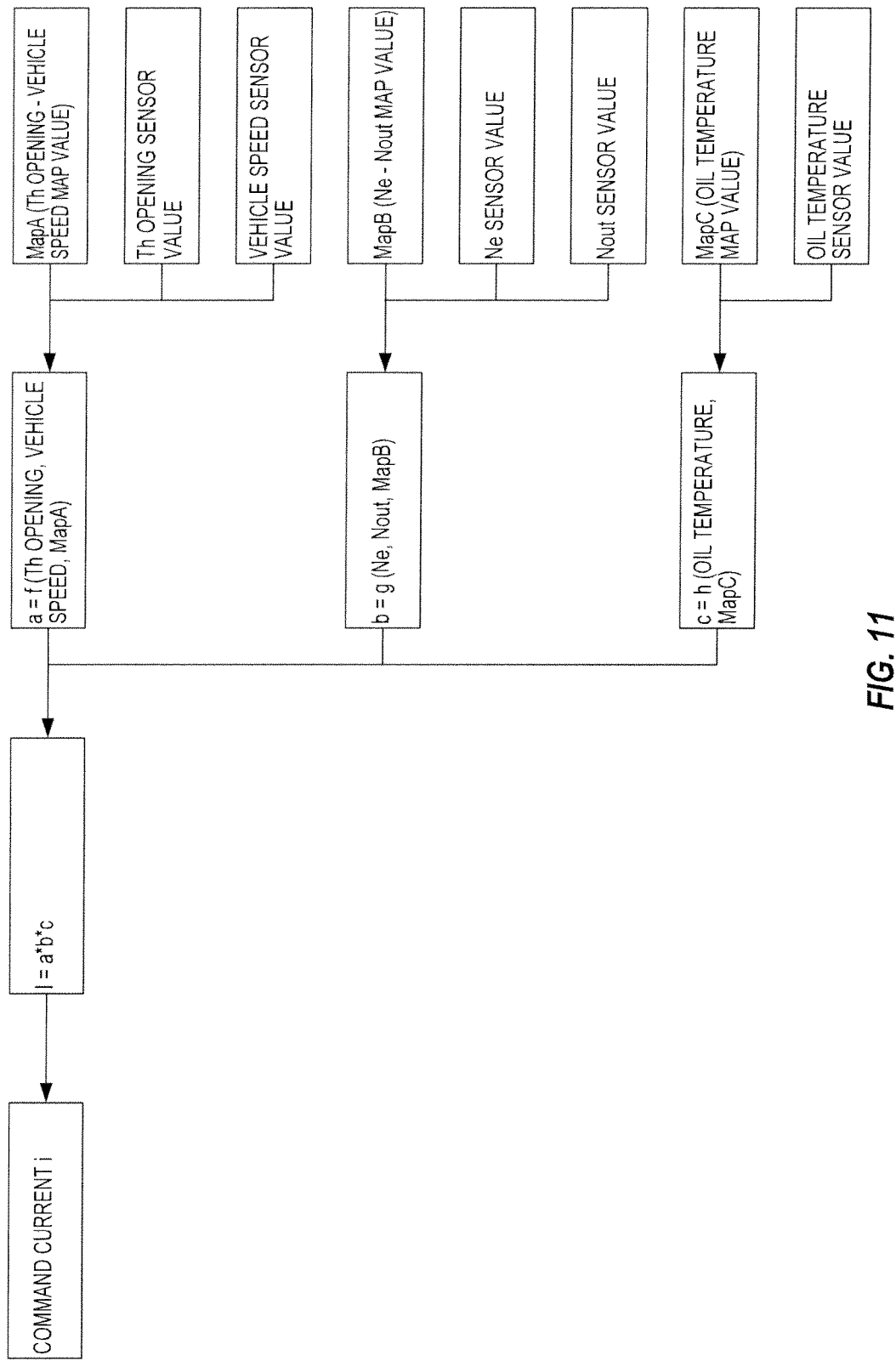
FIG. 11 is a view explaining the creating procedure of the FT diagram.
Figure 12:
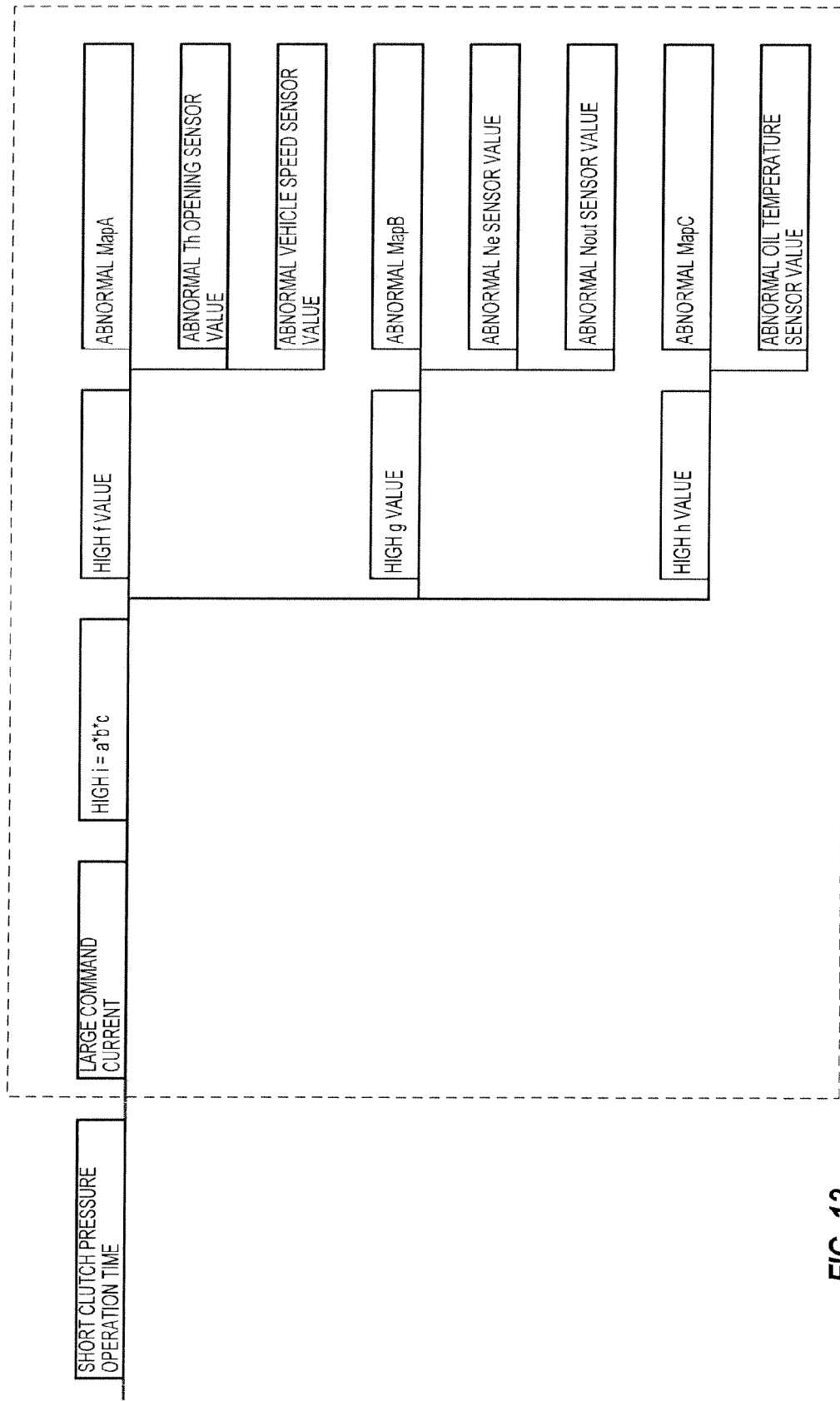
FIG. 12 is a view explaining the creating procedure of the FT diagram.
Figure 13:
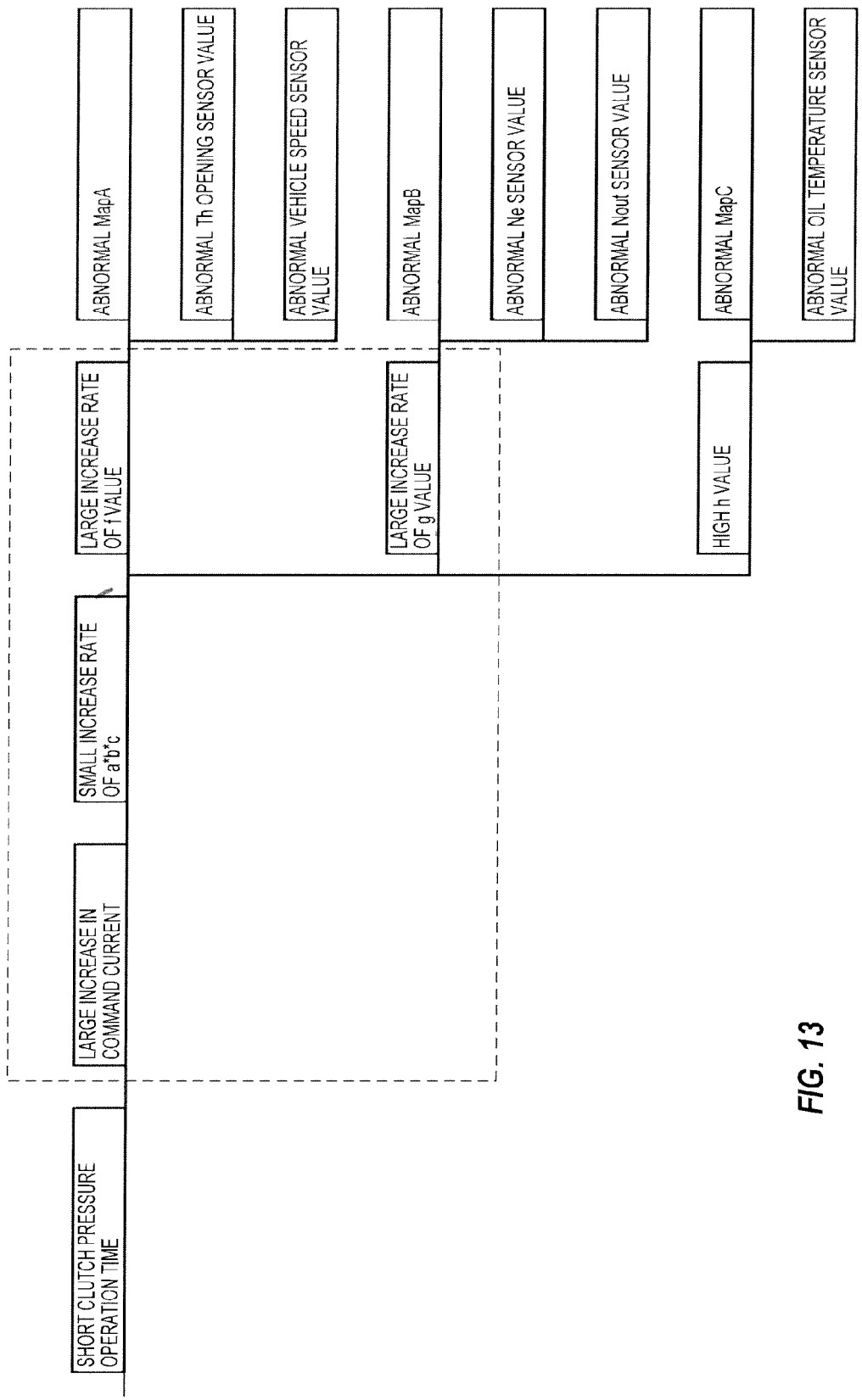
FIG. 13 is a view explaining the creating procedure of the FT diagram.

In the example illustrated in FIG. 10, the "large SOL command current" is the expandable event and is the fault of the control system, and therefore, a corresponding block diagram is created again in S10 (FIG. 11), and the "large SOL command current" is expanded into the further lower events based on the input/output relationship of this block diagram (FIG. 12), and the expansion result is corrected (a part in a broken line box in FIG. 13). It should be noted that only the events lower than the "short clutch pressure operation time" are illustrated in FIG. 12 and FIG. 13.

According to this embodiment, the FT diagram of the fault event is created by the above-described procedure.

Figure 14:
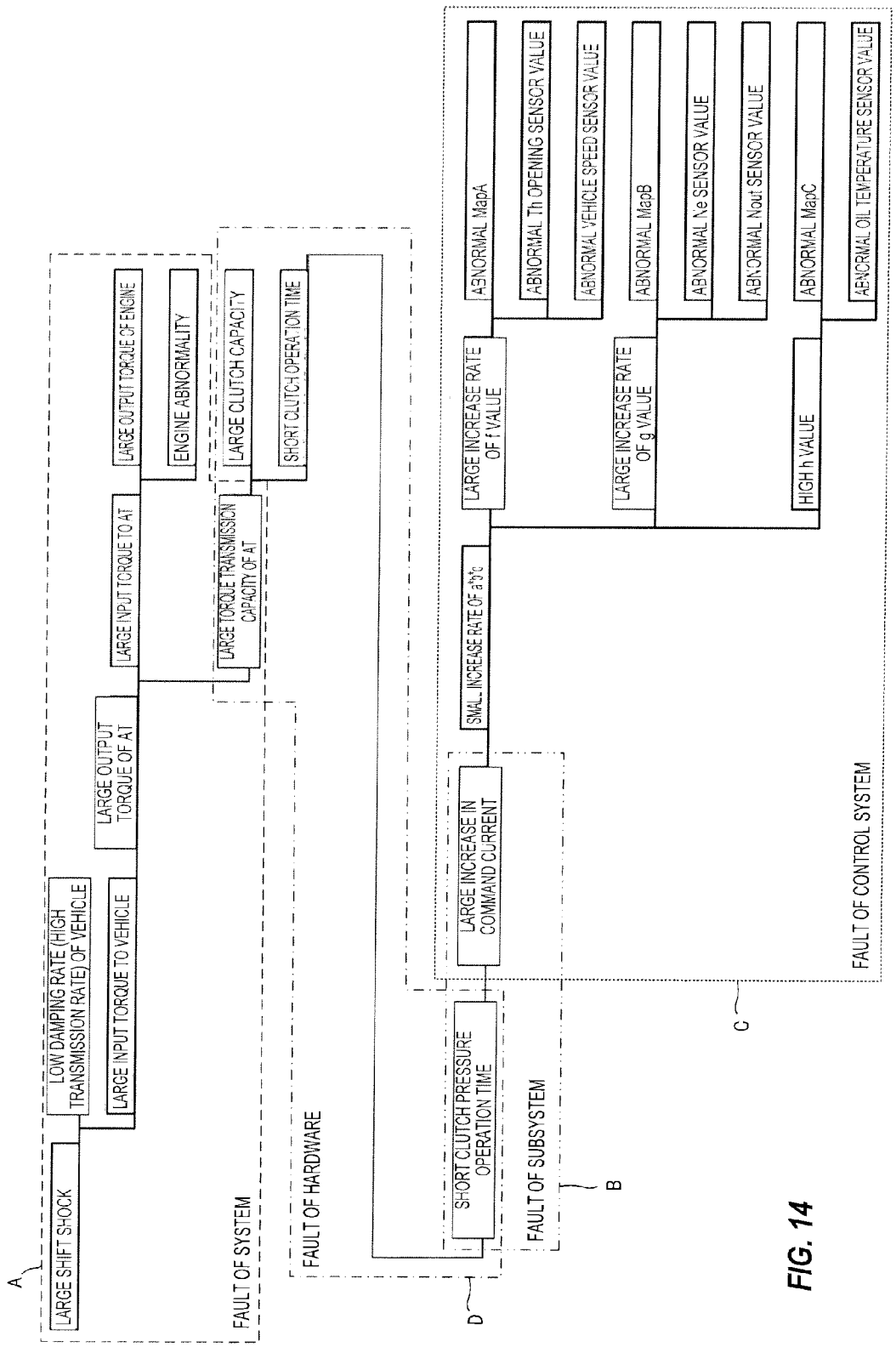
FIG. 14 is a completed FT diagram.
Figure 15:
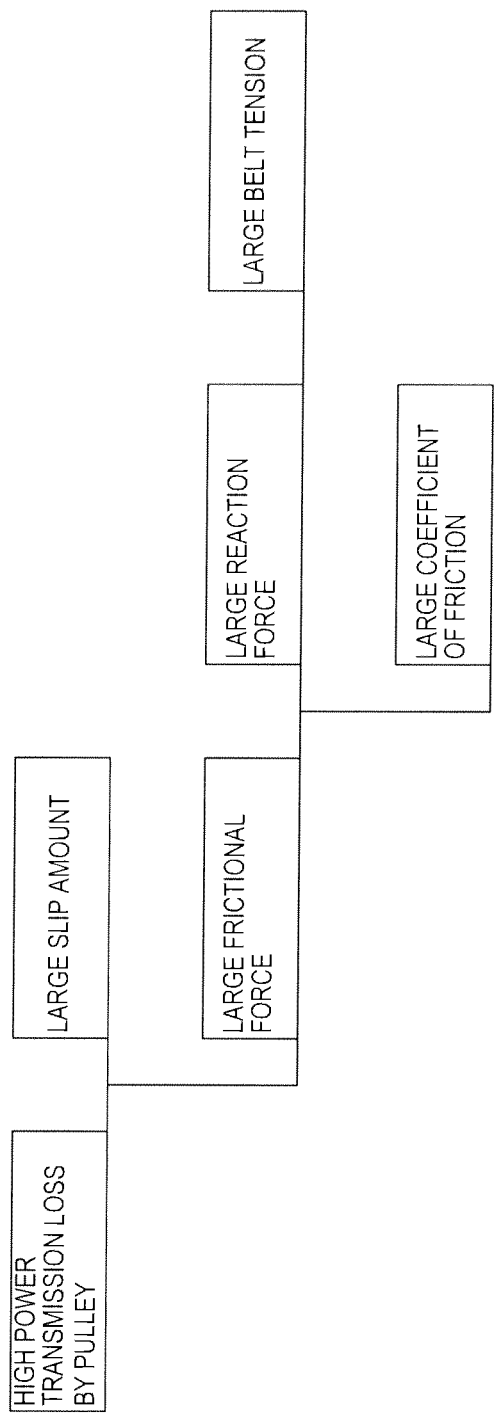
FIG. 15 is an example of the FT diagram.

FIG. 14 is an FT diagram of the fault event of the "large shift shock", which is created by the above-described procedure. In the diagram, parts in boxes A, B, and C are the faults of the system, the subsystem, or the control system, and are created by the procedure (S2 to S4, S10 to S12) in which the events are automatically expanded into the lower events from the input/output relationship in the block diagram created by the operator, and the operator corrects the events as appropriate.

In the diagram, a part in a box D is the fault of the hardware, and is created by the procedure (S8, S9) in which examines whether the expansion made by the operator is proper or not by using the relationship between the physical quantity of the expandable event and the physical quantities of its lower events.

Thus, according to this embodiment, the expansion procedure to the lower events changes according to the type of the event, which makes it possible to create the FT diagram with the less workload and with the higher accuracy.

Although the embodiment of the present invention has been explained thus far, the above-described embodiment is only one of the examples of applying the present invention, and is not intended to limit the technical scope of the present invention to the specific structure of the above-described embodiment.

The present application claims priority to Japanese Patent Application No. 2011-229597 filed to Japan Patent Office on Oct. 19, 2011, and the contents of this application are incorporated herein by reference in their entirety.

The invention claimed is:

1. A fault tree (FT) diagram creation assistance device, comprising:
   a processor and a memory coupled to the processor, the memory being configured to store vehicle data received from a vehicle,
   the processor comprising
      an event classification unit programmed to classify an event experienced by the vehicle as one of (1) a vehicle hardware fault or (2) a vehicle system fault which is not the vehicle hardware fault, and to determine an expansion procedure in response to the classification of an event as a vehicle hardware fault and to the classification of an event as a vehicle system fault;
      an expansion result examination unit programmed to perform expansion result examination in accordance with the event being classified as the one of the vehicle hardware fault or the vehicle system fault, and
         when the event is classified as the vehicle hardware fault, automatically expand the event into lower events based on an input received by the processor, acquire a physical quantity of the event and physical quantities of the lower events, and determine whether the event is expanded properly or not based on one or more relationships between the physical quantity of the event and the physical quantities of the lower events; and
      an event expansion unit programmed to
         perform event expansion in accordance with the event being classified as the one of the vehicle hardware fault or the vehicle system fault, and
         when the event is classified as the vehicle system fault, create a block diagram of the vehicle system based on the input received by the processor, and automatically expand the event into the lower events based on one or more input/output relationships in the block diagram of the vehicle system,
      wherein the processor is programmed to edit the block diagram in response to an input received by the processor so as to modify contents of the block diagram.

2. The FT diagram creation assistance device of claim 1, wherein the event classification unit is configured to automatically identify an event as an expandable event in response to comparison of the event to first data stored in the memory, the first data comprising a list of expandable events.

3. The FT diagram creation assistance device of claim 2, wherein the event classification unit is configured to automatically classify the expandable event as the one of the vehicle hardware fault or the vehicle system fault by referring to second data stored in the memory, the second data indicating whether a plurality of events are vehicle hardware faults or vehicle system faults.

4. The FT diagram creation assistance device of claim 3, wherein the expansion result examination unit is programmed to determine whether the expandable event is expanded properly by dimensional indexing of physical quantities associated with the expandable event and the lower events, when the expandable event is the vehicle hardware fault.

5. The FT diagram creation assistance device of claim 4, wherein the expansion result examination unit is further programmed to:
   in response to determining that the expandable event is expanded properly, identify another expandable event; and
   in response to determining that the expandable event is not expanded properly, correcting an event expanded improperly from the expandable event, prior to identifying another expandable event.

6. The FT diagram creation assistance device of claim 1, wherein the expansion result examination unit is configured to analyze the block diagram beginning from a downstream end of the block diagram, and set a block on an upstream side as a block to be analyzed upon determining that the block is present on the upstream side.

7. A fault tree (FT) diagram creation assistance device, comprising:
   a processor and a memory coupled to the processor, the memory being configured to store vehicle data received from a vehicle,
   the processor comprising
      a first event expansion unit programmed to create a block diagram of a vehicle system relating to a fault event experienced by the vehicle based on an input received by the processor, and automatically expand the fault event into lower events based on one or more input/output relationships in the block diagram;
      an event classification unit programmed to allow an event capable of expanding into a further lower event, among the lower events, to be an expandable event, and to classify the expandable event as one of (1) a vehicle hardware fault or (2) a vehicle system fault which is not the vehicle hardware fault, the processor being programmed to determine an expansion procedure in response to the classification of an expandable event as a vehicle hardware fault and to the classification of an event as a vehicle system fault;
      an expansion result examination unit programmed to
         perform expansion result examination in accordance with the event being classified as the one of the vehicle hardware fault or the vehicle system fault, and
         when the expandable event is classified as the vehicle hardware fault, automatically expand the expandable event into the further lower event based on the input received by the processor, acquire physical quantities of the expandable event and the further lower event, and determine whether the expandable event is expanded properly or not based on one or more relationships between the physical quantity of the expandable event and the physical quantity of the further lower event; and
      a second event expansion unit programmed to
         perform event expansion in accordance with the event being classified as the one of the vehicle hardware fault or the vehicle system fault, and
         when the expandable event is classified as the vehicle system fault, create a block diagram of the vehicle system based on the input received by the processor, and automatically expand the expandable event into the further lower event based on one or more input/output relationships in the block diagram of the vehicle system,
   wherein the processor is programmed to edit the same block diagram in response to an input received by the processor so as to modify contents of the same block diagram.

8. A fault tree (FT) diagram creation assistance method for assisting to creation of an FT diagram using a computer, comprising:
   storing, in a memory of the computer, vehicle data received from a vehicle;
   classifying, by the computer, an event experienced by the vehicle as one of (1) a vehicle hardware fault or a fault of a vehicle system or (2) a vehicle system fault which is not the vehicle hardware fault;
   determining an expansion procedure in response to the classification of an event as a vehicle hardware fault and to the classification of an event as a vehicle system fault,
   automatically expanding, by the computer, the event into lower events, in accordance with the event being classified as the one of the vehicle hardware fault or the vehicle system fault,
   acquiring, by the computer, physical quantities of the event and the lower events, and determining, by the computer, whether the event is expanded properly or not based on one or more relationships between the physical quantity of the event and the physical quantities of the lower events, when the event is classified as the vehicle hardware fault; and
   creating, by the computer, a block diagram of the vehicle system, and automatically expanding, by the computer, the event into the lower events based on one or more input/output relationships in the block diagram of the vehicle system, when the event is classified as the vehicle system fault, and
   receiving edits to the block diagram in response to an input received by the computer so as to modify contents of the block diagram.

9. A fault tree (FT) diagram creation assistance method for assisting creation of an FT diagram using a computer, comprising:
   storing, in a memory of the computer, vehicle data received from a vehicle;
   creating, by the computer, a block diagram of a vehicle system relating to a fault event experienced by the vehicle, and automatically expanding, by the computer, the fault event into lower events based on one or more input/output relationships in the block diagram;
   allowing, by the computer, an event capable of expanding into a further lower event, among the lower events, to be an expandable event, and classifying, by the computer, the expandable event as one of (1) a vehicle hardware fault or (2) a vehicle system fault which is not the vehicle hardware fault,
   determining an expansion procedure in response to the classification of an event as a vehicle hardware fault and to the classification of an event as a vehicle system fault;

expanding, by the computer, the expandable event into the further lower event, in accordance with the event being classified as the one of the vehicle hardware fault or the vehicle system fault, acquiring, by the computer, physical quantities of the expandable event and the further lower event, and determining, by the computer, whether the expandable event is expanded properly or not based on relationship between the physical quantity of the expandable event and the physical quantity of the further lower event, when the expandable event is classified as the vehicle hardware fault; and creating, by the computer, a block diagram of the vehicle system, and expanding, by the computer, the expandable event into the further lower event based on one or more input/output relationships in the block diagram of the vehicle system, when the expandable event is classified as the vehicle system fault, and causing editing of the same block diagram in response to an input received by the computer so as to modify contents of the same block diagram.

\* \* \* \* \*